United States Patent

[11] 3,585,873

| [72] | Inventor | Jorg Austen<br>Weinsberg, Germany |
|---|---|---|
| [21] | Appl. No. | 840,222 |
| [22] | Filed | July 9, 1969 |
| [45] | Patented | June 22, 1971 |
| [73] | Assignee | Firma Dr.-Ing.h. c. F. Porsche KG<br>Stuttgart, Germany |
| [32] | Priority | July 10, 1968 |
| [33] | | Germany |
| [31] | | P 17 75 155.2 |

[54] SYNCHRONIZING DEVICE FOR BEVEL-WHEEL REVERSING GEAR SYSTEMS
10 Claims, 2 Drawing Figs.

[52] U.S. Cl............................................. 74/339,
74/378, 74/404, 192/51, 192/53 F
[51] Int. Cl....................................................... F16h 3/38,
F16h 3/14, F16d 11/06
[50] Field of Search.......................................... 74/404,
378, 339; 192/21, 51, 53

[56] References Cited
UNITED STATES PATENTS

| 2,932,373 | 4/1960 | Schmid.......................... | 74/339 |
| 3,386,548 | 6/1968 | Jones............................. | 74/339 X |

FOREIGN PATENTS

| 1,111,952 | 7/1961 | Germany..................... | 74/339 |
| 938,303 | 10/1963 | Great Britain................ | 74/378 |

Primary Examiner—Leonard H. Gerin
Attorney—Craig, Antonelli, Stewart and Hill

ABSTRACT: A synchronizing device for bevel-wheel reversing gears, particularly adapted for use in automotive vehicles, including a clutch sleeve displacable along the output shaft and having teeth thereon adapted to engage with coupling teeth provided at the output bevel gears.

PATENTED JUN22 1971 3,585,873

Inventor:
JÖRG AUSTEN

BY Craig, Antonelli, Stewart & Hill
ATTORNEYS

SYNCHRONIZING DEVICE FOR BEVEL-WHEEL REVERSING GEAR SYSTEMS

BACKGROUND OF THE INVENTION

In conventional arrangements of reversing gears, the bevel gear is synchronized by means of a multipartite synchronizing device consisting of friction rings rotating on both sides of the shifting sleeve, which rings are adapted to be brought into frictional engagement with the widened hub of the gears. As the space available between the cogwheels of a bevel-wheel reversing gear is normally restricted, it is generally impossible to equip reversing gears with such means for synchronizing when the gears are subjected to substantial loads. Therefore, in applications involving highly stressed drive gears, such as those of rail vehicles or automotive vehicles, synchronizing devices have generally been omitted. Instead of sychronizing devices of the type described above, a braking device has been provided on the gear input shaft, the braking device, in conjunction with inclined coupling teeth on the shifting sleeve, facilitating the meshing of the gears. It should readily be appreciated, however, that an arrangement of this latter type entails great expenditures for the production of the structural components employed.

Accordingly, it is an objective of the present invention to provide a synchronizing device for reversing gears of the type mentioned hereinabove which can be accommodated within a relatively small space.

Further, it is an objective of the present invention to provide a synchronizing device of the type described above which can be utilized for the synchronization of relatively large masses.

It is still another objective of the present invention to provide a synchronizing device which can be utilized in connection with gears which are subjected to relatively great stresses.

Finally, it is an objective of the present invention to provide a synchronizing device of the type described hereinabove which eliminates the necessity of employing a separate braking device on the gear input shaft.

SUMMARY OF THE INVENTION

The aforementioned objectives are accomplished, in accordance with the present invention, by providing the clutch sleeve with friction members which directly engage the front faces of the toothed output bevel gears in order to effect synchronization. By utilizing the teeth of the bevel gears for the synchronizing operation, relatively large friction surfaces are employed within a narrow space for the synchronizing means, thus facilitating the use of relatively simple synchronizing means even in conjunction with high-stress gear systems.

By constructing the friction elements in the form of slotted and resilient synchronizing rings, the friction surfaces of which cooperate with the front faces of the output bevel gears facing the conical tip of the gears, an effective arrangement is attained which exhibits a large synchronizing capability. Another advantage inherent in the construction in accordance with the present invention resides in the fact that the frictional work for speed synchronization need not be carried out against the effect of a continuous oil film on the frictional surfaces, since one of the frictional surfaces is discontinuous. A further simplification of the synchronizing device is achieved by arranging the synchronizing rings in the plane of the clutch teeth, surrounding the clutch sleeve and centered on the walls receiving the shift fork therebetween. This arrangement facilitates an advantageous utilization of the structural width of the clutch sleeve.

BRIEF DESCRIPTION OF THE DRAWINGS

The aforementioned objectives, features and advantages of the present invention will become more readily apparent from a consideration of the detailed description hereinbelow, when considered in conjunction with the accompanying drawings, wherein.

DETAILED DESCRIPTION OF THE DRAWINGS

Figure 1:
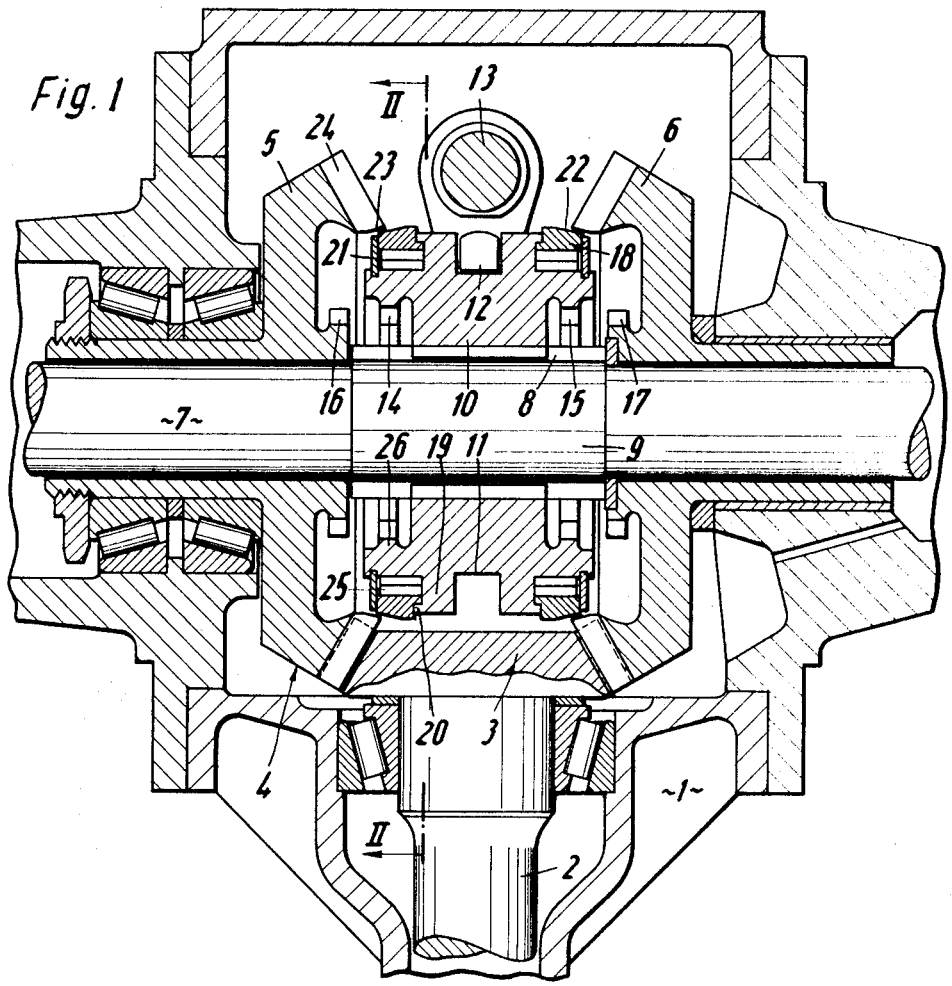
FIG. 1 represents a horizontal section through a bevel-wheel reversing gear for an automotive vehicle, equipped with a synchronizing device constructed in accordance with the present invention.
Figure 2:
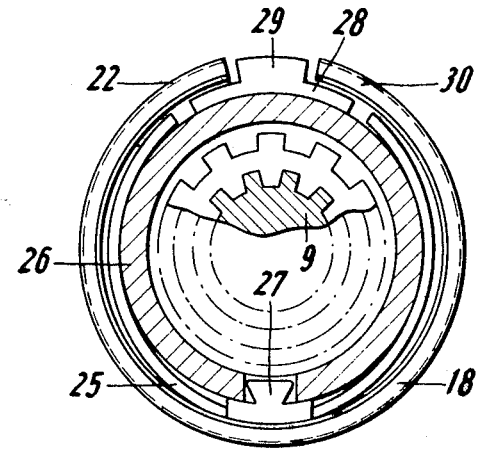
FIG. 2 represents a cross section along line II–II of FIG. 1.

In the transmission case 1, a drive shaft 2 is disposed in driving connection with the internal combustion engine by way of a change speed gear transmission (not shown). The shaft 2 is integral with the drive or input level gear 3 of a bevel-wheel reversing gear 4. The drive bevel gear 3 is in driving connection with output bevel gears 5 and 6, the latter being mounted upon the gear output shaft 7 in a freely rotatable manner.

The gear output shaft 7 has a central section 9 between the gear wheels 5 and 6, which section is provided with spline teeth 8 and on which a clutch sleeve 10 is disposed in an axially displaceable manner. The clutch sleeve 10 includes an annular groove 11 engaged by a shift fork 12. The shift fork 12 can be actuated by the operator of the vehicle by means of a shift rod 13. The clutch sleeve 10 is provided with internal teeth 14 and 15 which are selectively engageable with the clutch or coupling teeth 16 of the bevel gear 5 or the teeth 17 of the bevel gear 6. Engagement is effected by means of a synchronizing device including a slotted and resilient synchronizing ring 18.

Since the synchronizing devices of both sides of the clutch are of identical construction, the device of only one side is described hereinbelow.

The synchronizing ring 18, disposed within the plane of the clutch teeth 14 and 15, respectively, is centered upon the wall 19 defining the annular groove 11 by means of a shoulder 20 and is constrained in the axial direction by means of a retaining ring 21. The frictional surface 22 of the synchronizing ring 18 is inclined with respect to the axis of rotation of the gear output shaft 7 and cooperates with similarly inclined front faces 23 of the teeth 24 of the output bevel gear 5, disposed in proximity to the conical tip of the gear. The synchronizing ring 18 is also effected by clamping bands 25 provided between the hub 26 of the clutch sleeve 10 and the synchronizing ring 18. The clamping or locking bands 25 rest against an abutment 27 pivotably supported within the hub 26 and are tensioned by means of a slide lock 28 including a projection 29 extending between the ends 30 of the synchronizing ring 18.

In the position illustrated in FIG. 1, the shifting sleeve 10 is in the idling or neutral position. When the engine is running, the bevel gears 5 and 6 are driven by way of the drive shaft 2. If it is now desired to drive the gear output shaft 7 in one rotational direction or the other, the clutch sleeve 10 is displaced in the desired shifting direction by means of the shift fork 12. When, during this process, for example, the friction surface 22 of the synchronizing ring 18 comes into frictional engagement with the front face 23 of the row of teeth 24 of the bevel gear 5, serving as the counterfriction surface, then the clutch sleeve 10 is accelerated to the revolutional speed of the gear 5. During this synchronizing operation, the additional contact pressure caused by the locking band 25 is simultaneously effective upon the synchronizing ring 18, thus facilitating rapid synchronization.

Thereafter, the inner teeth 14 of the clutch sleeve 10 can be brought into engagement with the clutch teeth 16 of the bevel gear 5 without producing undesirable shifting noise. A similar result obtains when the clutch sleeve 10 is shifted to the right, as viewed in FIG. 1 and the teeth 15 and 17 mesh in order to produce a reversal of the direction of rotation at the gear output shaft 7.

It should be readily apparent that the scope of the present invention is not limited to the details of the illustrated embodiment. Thus, for example, it is feasible to provide arcuate friction surfaces on the synchronizing ring and on the front faces of the output bevel gears in place of the inclined surfaces illustrated. While the present invention has been described hereinabove with reference to the details of a single embodiment, it is to be clearly understood that the scope of the invention is not limited to the specific details illustrated, but is susceptible of numerous changes and modifications as would be apparent to one with normal skill in the pertinent technology.

What I claim is:

1. A synchronizing device for a bevel-wheel reversing gear arrangement having output shaft means in a freely rotatable manner, comprising:

clutch sleeve means supported upon said output shaft means for axial displacement thereon, friction means supported by said clutch sleeve means, said friction means being selectively engageable with an end face of gear teeth provided on said output bevel gear means, whereby rotational speed synchronization is attained.

2. A synchronizing device according to claim 1, wherein said bevel gear means have a truncated conical longitudinal cross-sectional configuration and said friction means include slotted and resilient synchronizing rings having friction surfaces adapted to selectively engage with the front faces of the bevel gear means facing the plane of truncation.

3. A synchronizing device according to claim 2, wherein said clutch sleeve means includes internal coupling teeth and said synchronizing rings are disposed annularly about said clutch sleeve means in the plane of said coupling teeth.

4. A synchronizing device according to claim 3, wherein at least two synchronizing rings are provided and wherein the peripheral surface of said clutch sleeve means includes an annular groove disposed substantially midway between said synchronizing rings.

5. A synchronizing device according to claim 4, further comprising shift fork means operable by an operator of the motor vehicle, said shift fork means being engageable within said annular groove of said clutch sleeve means.

6. A synchronizing device according to claim 5, further including clamping band means disposed between the hub portion of said clutch sleeve means and each of said synchronizing rings.

7. In a bevel-wheel reversing gear system having output shaft means and at least two bevel gear means mounted thereon in a freely rotatable manner, the improvement comprising:

clutch sleeve means supported upon said output shaft means for axial displacement thereon between said two bevel gear means, said clutch sleeve means including friction means adapted for selective engagement with an end face of gear teeth provided on said bevel gear means, whereby rotational speed synchronization is attained.

8. The improvement according to claim 7, wherein said bevel gear means have a truncated conical longitudinal cross-sectional configuration and said friction means include slotted and resilient synchronizing rings having friction surfaces adapted to selectively engage with the front faces of said bevel gear means facing the plane of truncation.

9. The improvement according to claim 8, wherein said synchronizing rings are disposed annularly about said clutch sleeve means in the region of each end thereof and the peripheral surface of said clutch sleeve means further includes an annular groove disposed approximately midway between said synchronizing rings.

10. The improvement according to claim 9, further comprising means for controlling the selective engagement of said clutch sleeve means with one of said bevel gear means, including shift fork means engageable within said annular groove.